United States Patent [19]

Rojey

[11] Patent Number: 4,948,394

[45] Date of Patent: Aug. 14, 1990

[54] PROCESS AND DEVICE FOR COMPRESSING AND TRANSPORTING A GAS CONTAINING A LIQUID FRACTION

[75] Inventor: Alexandre Rojey, Garches, France

[73] Assignee: Institut Francais du Petrole, Rueil Malmaison, France

[21] Appl. No.: 773,575

[22] Filed: Sep. 9, 1985

[30] Foreign Application Priority Data

Sep. 7, 1984 [FR] France ............ 84 13757

[51] Int. Cl.⁵ ............ B01D 53/14

[52] U.S. Cl. ............ 55/48; 55/51; 55/52; 55/55

[58] Field of Search ............ 55/29–32, 55/48, 51, 52, 55

[56] References Cited

U.S. PATENT DOCUMENTS

| | | | |
|---|---|---|---|
| 2,947,379 | 8/1960 | Aubrey | 55/89 X |
| 3,133,875 | 5/1964 | Hirschbeck et al. | 55/89 X |
| 3,256,676 | 6/1966 | Blauth | 55/48 |
| 3,322,411 | 5/1967 | Moore | 55/32 X |
| 3,634,998 | 1/1972 | Patterson | 55/32 |
| 3,676,981 | 7/1972 | Afdahl et al. | 55/30 |
| 3,994,074 | 11/1976 | Lowther | 55/32 X |
| 4,273,562 | 6/1981 | Niskanen | 55/52 |
| 4,282,013 | 8/1981 | Franklin et al. | 55/55 X |
| 4,294,590 | 10/1981 | Linde et al. | 55/49 X |

FOREIGN PATENT DOCUMENTS

| | | | |
|---|---|---|---|
| 7528 | 2/1980 | European Pat. Off. | 55/48 |

*Primary Examiner*—Robert Spitzer
*Attorney, Agent, or Firm*—Antonelli, Terry, Stout & Kraus

[57] ABSTRACT

Process and device for compression and transportation of a gas containing a liquid hydrocarbon fraction.

The process includes introduction of a solvent into the gas coming from the well, formation of a homogeneous dispersion, compression of the resulting mixture, at least partial separation in the compressor of the liquid fraction contained in the gas, and transportation of the compressed mixture.

The process is particularly suitable for production of gas at sea and can be carried out entirely under the sea.

17 Claims, 1 Drawing Sheet

Figure 1:
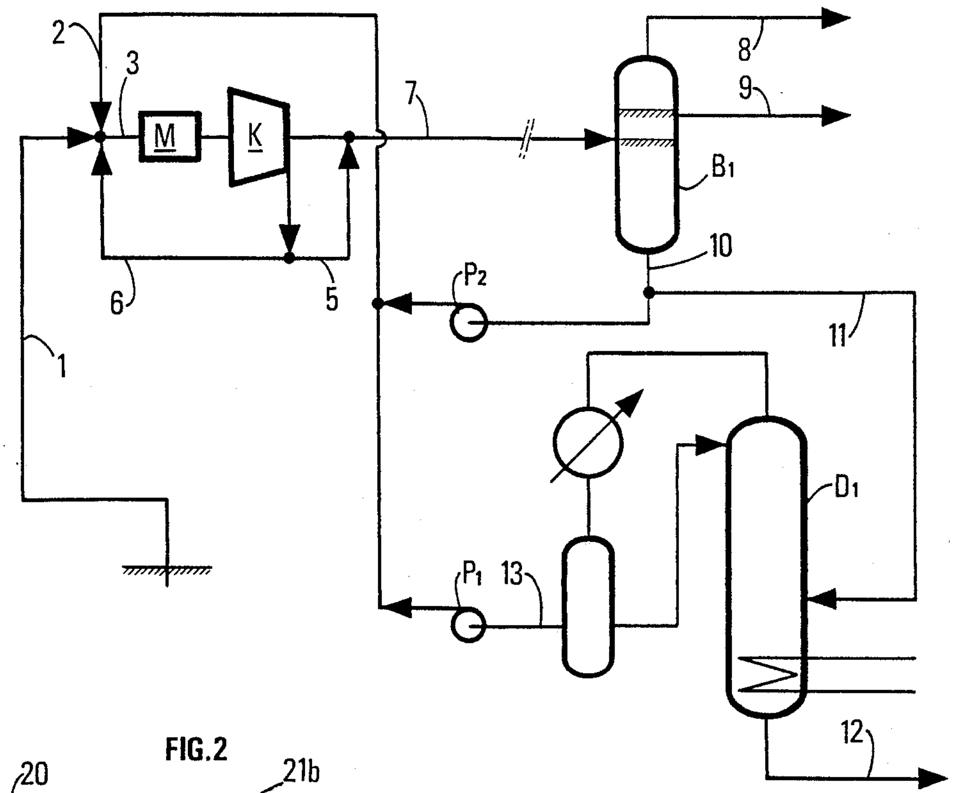

PROCESS AND DEVICE FOR COMPRESSING AND TRANSPORTING A GAS CONTAINING A LIQUID FRACTION

The present invention relates to a process and device for transporting a gas containing a liquid hydrocarbon fraction. The present invention can be applied to production of natural gas. Production of natural gas according to the prior art requires a series of operations to make it transportable: separation of liquid fractions, dehydration to prevent formation of hydrates and reduce corrosion problems, deacidizing when the acid gas level of the natural gas is relatively high, and compression to compensate for pressure losses due to transportation through a pipe over a long distance.

This series of operations requires expensive, heavy, and cumbersome equipment.

The liquid hydrocarbon fraction is separated in a series of decanting tanks operating at decreasing pressure levels in order to obtain a liquid fraction stable at atmospheric pressure. The gas fractions obtained in succession must be recompressed in various compressors to obtain a single gas fraction at the initial pressure. When the acid gas level is relatively high, the natural gas must then be deacidized by an absorption process with a solvent which can be an amine for example. A process of this type requires an absorption column and a regeneration column. The natural gas must be dehydrated, for example by an absorption process with a solvent, which may be glycol. Such a process also requires an absorption column and a regeneration column. A low-temperature cooling stage using a refrigerating machine may be necessary to ensure more complete elimination of the heavy fraction contained in the gas which may condense during transportation by the retrograde condensation mechanism.

Finally, the resulting gas must be recompressed to be transported and this compression stage represents a substantial portion of the investment outlay.

This series of operations is complex and costly. These disadvantages, which brake the development of natural gas when the latter is produced on land, become a major obstacle to development of natural gas when produced at sea.

A new process permitting in particular production of natural gas avoiding the disadvantages described above has been discovered, forming the object of the present invention. This process is particularly advantageous in the case of production at sea. In general, the process according to the invention permits transportation of a two-phase gas-liquid mixture of hydrocarbons.

The difficulties encountered in processes known in the prior art derive from the fact that it is not possible to transfer the gas to the compressor directly, due on the one hand to the risk of hydrate formation and on the other hand to the fact that the compressors used, generally of the reciprocating or centrifugal type, do not admit a liquid fraction at the inlet.

It has been discovered that, in such a case, it is possible considerably to simplify the natural gas process by injecting polar solvent to inhibit the hydrates and possibly reduce the acid-gas level provided the compression stage is carried out-in a compressor able to receive a gas phase containing a liquid phase or even two liquid phases in emulsion and to transport the resulting mixture thus compressed by two-phase flow. It has also been discovered that such a compression stage can also be carried out in a compressor having a rotor rotating continuously in a hollow housing provided that at least part of the liquid fraction contained in the gas at the inlet is collected at the periphery of the rotor, so that pulsed and/or discontinuous flows of gas and liquid, which would cause deterioration of the compressor, can be avoided.

The prior art can be illustrated by French Patent Nos. FR-A 2,417,057 and FR-A 2,273,177, U.S. Pat. Nos. 4,132,535 and 4,416,333, and British Patent No. 1,561,454.

Thus, the present invention relates to a process for compressing and transporting a gas containing a liquid hydrocarbon fraction. This process is characterized by comprising the following stages in combination: (a) introduction into said gas of a liquid fraction containing a polar solvent, (b) transfer of said gas to a compressor, (c) compression of said gas in said compressor and recovery of at least part of the liquid fraction contained in said gas during the same stage, (d) reintroduction of at least part of the liquid fraction recovered in stage (c) into the compressed gas, the remaining fraction being recycled at a point upstream of said compressor, and (e) transportation of said compressed gas resulting from stage (d) to a receiving site, it being possible for stage (a) to be carried out before or after stage (c).

The compressor can comprise a rotor rotating continuously in a hollow housing, the liquid fraction contained in the gas admitted into the compressor being at least partly centrifuged at the internal periphery of the rotor during compression stage (c) and said liquid fraction being recovered at least in part at the internal periphery of the rotor during this same stage (c).

The process according to the invention can comprise an additional stage (f) involving separation at the receiving site of said gas into three phases, namely by a gas hydrocarbon phase, a liquid hydrocarbon phase, and a solvent phase, regeneration of at least part of the solvent phase by separating an aqueous fraction and pumping the solvent phase to recycle it at a point upstream of the compressor.

The liquid fraction introduced into the gas stream can be dispersed homogeneously into droplets, the majority of which are less than 2 mm in diameter. This homogeneous dispersion of the liquid fraction can be accomplished during stage (a) with the aid of a static, propeller-type, or "packed" mixer.* The solvent phase can in particular be an alcohol such as methanol.

*Melangeur à garnissage—literally "mixer with packing". Term as such cannot be found. Trans. Note.

The liquid fraction contained in the gas to be compressed, and which is recovered at the periphery of the rotor, can provide a seal between the rotor and the housing.

Compressor K can be a screw compressor, possibly of the single-screw type, a liquid ring compressor, or a centrifugal compressor.

The flow of the liquid fraction collected at the compressor outlet can be recycled to the compressor inlet and controlled such as to represent 2 to 20% of the gas flow under discharge conditions.

Of course, if the compressor has several compression stages with the effluent leaving one stage being sent to the input of the next stage, the scope of the present invention will not be exceeded.

The ratio between the liquid volume flowrate and the gas volume flowrate under discharge conditions of compressor K will preferably be less than 50%, and can be less than 10%.

The process according to the present invention can be applied to production of gas at sea by means of under-sea well heads. Transfer to the surface can be accomplished by flexible pipes. The compression and recovery stage of at least part of liquid phase (c) can be accomplished on a fixed or floating platform.

When the process according to the invention is applied to production of natural gas at sea by means of under-sea well heads, all of stages (a) through (d) can be carried out under-water.

The present invention also relates to the device for carrying a gas containing a hydrocarbon liquid fraction. This device is characterized by having, in combination, an inlet line of said gas to be transported connecting the gas source to compression and separation means of the liquid phase and the gas phase, said means comprising an outlet orifice of the gas phase and an outlet orifice of the liquid phase, a solvent introduction line connecting a solvent source to the inlet line, and at least one transport line connected to the outlet orifice of the gas phase.

The device according to the invention can comprise a recirculation line for the liquid phase produced by the individual compression and separation means, said line connecting the liquid phase outlet orifice to the inlet line. The device according to the invention can comprise a liquid phase reintroduction line, said line connecting the outlet orifice of the liquid phase to the transport line.

The device according to the invention can comprise a mixing device upstream of the individual compression and separation means.

Of course, if means for controlling these flows passing into the various lines are provided, the scope of the present invention will not be exceeded.

Figure 2:
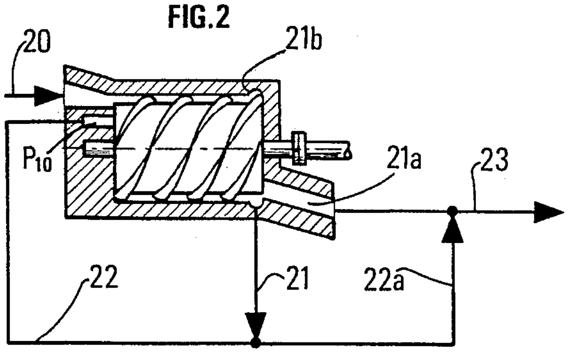
Figure 3:
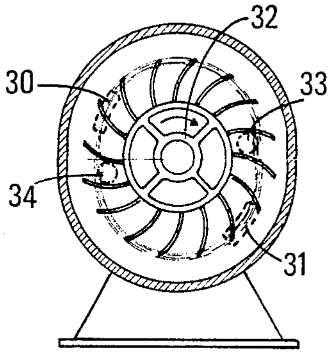
Figure 4:
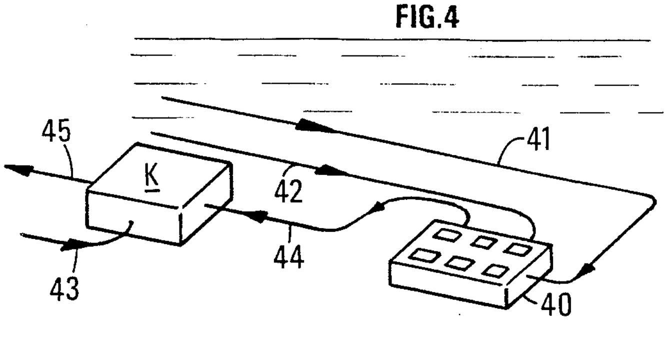

The present invention will be better understood and its advantages will appear more clearly by reading the description of the particular and in no way limitative example illustrated by the attached figures, of which:

FIG. 1 represents a schematic diagram describing the process according to the invention, FIGS. 2 and 3 show compressors suitable for application of the process, and FIG. 4 shows a particular application of the process according to the present invention.

The process according to the invention applied to production of natural gas is described in relation to FIG. 1 which shows its principal stages in schematic form.

The natural gas leaves the production well under pressure via pipe or line 1. It then contains a heavy hydrocarbon liquid fraction able to condense during one of the treatment or transportation stages. It is then mixed with a liquid fraction including a polar solvent S further along pipe or line 2. The resulting mixture is transferred to a compressor K through pipe or line 3.

A device M designed to obtain homogeneous dispersion of the liquid contained in the gas is placed at the inlet of compressor K. This device is preferably static and can be for example a mixer of the "packed mixer" type or a mixer of the propeller mixer type. The mixture leaves device M via pipe or line 4 and is admitted into compressor K.

Compression is advantageously accomplished by a compressor having a rotor rotating continuously in a hollow housing. The liquid fraction is thus largely collected at the periphery of the rotor, then evacuated continuously to avoid pulsed operation of the compressor which would lead to deterioration of the latter. At least part of this liquid fraction is reintroduced into the compressed gas (line 5 on the diagram of FIG. 1). The compressed mixture obtained is transported in a two-phase stream in pipe or line 7 to a receiving site.

At this receiving site, the liquid fractions contained in the gas drain into tank B1. The natural gas is evacuated by pipe or line 8 and the liquid hydrocarbon fraction is evacuated via pipe or line 9. The solvent phase is evacuated via pipe or line 10. A fraction of this solvent phase passing through pipe or line 11 is regenerated. This regeneration is shown by distillation column D1, but can also be accomplished by other known methods, for example by low-pressure expansion and vaporization. The aqueous fraction is evacuated via pipe or line 12 and the solvent fraction which contains a hydrocarbon fraction is evacuated via pipe or line 13 and recycled to the compressor inlet via pump P1. The nonregenerated fraction of the solvent phase is recycled by pump P2. In actual fact, the process is characterized by having the following stages, in combination: (a) introduction into the gas from the well of a liquid fraction containing a polar solvent S, (b) transfer of the resulting effluent to a compressor K, (c) compression of said gas in compressor K and recovery of at least a part of the liquid fraction contained in the gas, (d) reintroduction of at least part of the liquid fraction collected in stage (c) into the compressed gas, the remaining fraction being recycled at a point upstream of said compressor, and (c) transport of the compressed effluent resulting from stage (d) to a receiving site.

Stage (a) which concerns introduction of the polar solvent can be accomplished before or after stage (c). However, it is preferably for it to be accomplished before this stage.

As can be seen from the description of the process with respect to the diagram of FIG. 1, the process in general has an additional stage (f) for separation at the receiving site of the effluent transported in three phases which are a gas hydrocarbon phase, a liquid hydrocarbon phase, and a solvent phase, and for regeneration of at least part of the solvent phase by separating an aqueous fraction to pump the solvent phase to recycle it at stage (a).

Regeneration of the solvent phase is necessary to prevent accumulation of excessive water in said solvent phase. In the case of a gas saturated with water, in the absence of a regeneration stage, the water content of the solvent phase would tend to increase indefinitely without a steady-state regime being able to be established. However, this regeneration may not be necessary in the case of a natural gas with a low water and acid gas content. On the other hand, it is generally not essential to regenerate all the solvent flow and regeneration can involve merely a fraction of this flow which can, for example, be between 5 and 30%. As indicated, the various known methods of regenerating the solvent phase can be used. This regeneration can be carried out in one or more stages.

The gas separated from the liquid solvent phase can entrain solvent in the vapor phase. This entrainment of solvent in the vapor phase corresponds to a consumption which must be compensated by makeup. Entrainment of the solvent in the solvent phase can be reduced by various known methods, in particular by cooling the gas.

The various operations of stage (f) are normally carried out at the receiving site. In certain cases, stage (f) can be carried out wholly or in part before the transportation stage to facilitate the transportation stage.

Solvent S can be composed of various polar solvents and can be for example an alcohol, a ketone, an aldehyde, or an ether. Mixtures of solvents can also be used. The solvent is preferably of the alcohol type. Methanol is particularly suitable because of the high solubility of water in methanol and the low viscosity of methanol which enables pressure losses during the transportation stages to be limited. Various glycols can also be used such as, for example, diethylene glycol, triethylene glycol, or dimethylether tetraethylene glycol.

The heaviest hydrocarbons contained in the natural gas, in particular those which are present in the liquid phase, are partially soluble in the solvent phase. However, dissolution of water reduces this solubility and, after injection of the solvent, the liquid fraction contained in the gas is generally formed of two phases.

In the process according to the invention, said liquid fraction is preferably dispersed homogeneously in droplets the majority of which are less than 2 mm in diameter. This avoids localized, asymmetric mechanical stresses on the rotor of the compressor due to the impact of relatively large liquid masses, which are prejudicial to the service life of the compressor.

This homogeneous dispersion is preferably achieved with the aid of a static mixer: this static mixer can be formed by packing or a propeller. It can include one or more elements which can be rotationally staggered to favor turbulence. Other dispersion methods can also be employed, such as those using a rotating agitator.

When the liquid fraction consists of two phases, it forms a homogeneous emulsion which is itself dispersed in droplets.

In the process according to the invention, it has been discovered that the liquid fraction can then be sent to the compressor if a compressor with a rotor rotating continuously in a hollow housing is used, in which housing the liquid fraction contained in the gas admitted into the compressor is at least in part centrifuged at the internal periphery of the rotor during compression stage (c) provided said liquid fraction is collected at least in part at the internal periphery of the rotor during this same stage (c). It has been discovered that in this way the compressor provides a liquid fraction separation function in addition to its compression function.

It has also been discovered that the liquid fraction thus collected at the periphery of the rotor can provide a sealing function between the compressor's rotor and the inside of the housing. In this case, if the liquid fraction contained in the gas represents a relatively low volume flowrate, it may be necessary to cause part of the liquid collected at the compressor outlet to recirculate. It is then advantageous to cool this recirculating liquid flow to reduce the compression work as well as the discharge temperature.

Compressor K can be a screw compressor. Implementation of such a compressor in the process according to the invention is illustrated by the diagram of FIG. 2.

The mixture to be compressed arrives in the compressor via pipe 20. The liquid fraction is centrifuged by rotation of the rotor and provides a seal between the rotor and the inside of the housing. The liquid fraction collected at the periphery of the rotor is evacuated by recess **21*b* and pipe 21. Part of this liquid fraction is recycled at the inlet of the compressor via pipe 22 by means of pump P10 incorporated into the compressor. The remaining liquid fraction is recombined with the compressed gas by means of pipe 22*a*. The effluent thus formed is evacuated via pipe 23**.

Of course, the presence of pipe **22*a* is not necessary and the effluent leaving orifice 21*a*** can already include a liquid phase.

Two types of screw compressors in particular can be used: the double-screw compressor wherein the gas is compressed by meshing of a drive screw and a driven screw and the single-screw compressor wherein the gas is compressed by the meshing of a drive screw and two satellite wheels.

The single-screw compressor has the advantage of being more easily adapted to high-pressure operation since the rotor is subject to better-balanced stresses and undergoes no substantial radial thrust even at high discharge pressures. The single-screw compressor thus constitutes, in the application of the process according to the invention, a preferred screw compressor version.

Compressor K can also be a liquid ring compressor whose operation is shown schematically in FIG. 3.

The gas containing the liquid fraction arrives in the compressor via inlet orifices 30 and 31. It is then trapped between the blades of rotor 32 which rotates continuously. The liquid contained in the gas is collected at the inside periphery of the housing forming a liquid ring. When rotation of the rotor brings the gas trapped between the blades near discharge orifices 33 and 34, the edge of the liquid ring approaches the shaft of the rotor due to the internal shape of the housing and the gas is compressed.

At the compressor outlet, part of the liquid contained in the gas is evacuated with the compressed gas and part of it is recycled toward the compressor inlet.

As in the case of the screw compressor, the liquid fraction contained in the gas arriving at the compressor serves to provide a sealing function between the rotor and the housing. When said liquid fraction provides such a sealing function and if the flowrate of the liquid fraction initially contained in the gas is relatively low, the flowrate of the liquid fraction collected at the outlet of compressor K which is recycled to the compressor inlet must be controlled such as to represent preferably 2 to 20% of the gas flowrate under discharge conditions.

The liquid ring compressor is preferably used when the compression ratio to be obtained is low.

The screw compressor and the liquid ring compressor are not the only usable compressors.

The centrifugal compressor can also be used, provided the liquid phase centrifuged by rotation of the rotor can be collected at the inside periphery of the housing.

Thus, the present invention provides, on the individual compression and separation means, at least one liquid phase recovery orifice.

The compression and separation stage (c) of the process can be accomplished by using several stages of individual compression and separation means, the mixture of the liquid and gas phases leaving one stage being sent to the inlet of the next stage.

It is thus possible to reach very high discharge pressures, for example between 100 and 200 bars, which may be necessary to transport the gas, provided the compressor is dimensioned for the corresponding mechanical stresses.

The process according to the invention enables a natural gas containing variable liquid fractions to be compressed and transported, but it applies preferably to cases where the quantity of liquid entrained by the gas represents a volume flowrate less than 50% of the total volume flowrate of the two-phases mixture under discharge conditions of the compressor (GOR, volume of gas over volume of liquid, greater than 1 under compressor discharge conditions) and more particularly in the case where the quantity of liquid entrained represents a volume flowrate less than 10% of the total volume flowrate under discharge conditions (GOR greater than 9 under discharge conditions).

The process is particularly advantageous in the case of production of gas at sea.

Indeed, in the production processes known in the prior art, the various operations of separation of liquid fractions, dehydration, deacidizing, and compression must be carried out on a platform. This calls for a large investment outlay.

It is now possible to produce the natural gas by means of under-sea well heads which are controlled either from a command and control platform or, with the improved reliability of remote-control devices, from a central platform or even a station on land.

In this case, a first embodiment of the process according to the invention consists of producing the natural gas at sea by means of under-sea well heads and transferring it to the surface, for example by flexible pipes, the compression stage (c) being carried out on a fixed or floating platform. Implementation of the process eliminates the various operations of separation of liquid fractions, recompression of gas fractions obtained by successive expansions of liquid fractions, dehydration, and compression, and thus considerably cuts down the weight and size of the facilities mounted on the platform.

A second embodiment of the process according to the invention consists of carrying out all of stages (a) through (d) of the process under water.

Compressor K must then be placed under water in a sealed caisson. It is supplied with power by a submarine electric cable and is remoted-controlled.

This embodiment of the process is illustrated by the diagram in FIG. 4.

The gas is produced by a submarine production station 40 with six well heads. The solvent injected into the gas is introduced via pipe 41.

Electric power is supplied by line 42. The gas produced is fed into a collector and evacuated via pipe 44 whereby it is sent to compressor K. Compressor K is supplied with electrical power by line 43. The compressed two-phase mixture is evacuated by pipe 45 to be transported in a two-phase flow to a receiving station (not shown) which may be located on land.

I claim:

1. A process for compression and transportation of a gas containing a liquid hydrocarbon fraction, characterized by having the following stages in combination: (a) introduction into said gas of a liquid hydrocarbon fraction including a polar solvent, (b) transfer of the resulting two-phase gas-liquid mixture to a compressor, (c) compression of said mixture in said compressor and recovery of at least a part of the liquid hydrocarbon fraction contained in said gas during the same stage, (d) reintroduction of at least part of the liquid hydrocarbon fraction collected in stage (c) into the compressed gas-liquid mixture downstream of said compressor, the remaining part of said liquid hydrocarbon fraction being recycled at a point upstream of said compressor, and (e) transportation of said compressed gas-liquid mixture resulting from stage (d) to a receiving site; stage (a) being effected before or after stage (b).

2. A process according to claim 1, characterized by using a compressor having a rotor rotating continuously in a hollow housing, the liquid fraction contained in the gas admitted into compressor being at least in part centrifuged at the inside periphery of the rotor during compression stage (c), and by said liquid fraction being recovered at least in part at the inside periphery of the housing during this same stage (c).

3. A process according to one of claims 1 to 2, characterized by having an additional stage (f) comprising separation at the receiving site of said gas into three phases which are a gas hydrocarbon phase, a liquid hydrocarbon phase, and a solvent phase, regeneration of at least part of the solvent phase by separating an aqueous fraction and pumping the solvent phase to recycle it at a point upstream of said compressor.

4. A process according to claim 1, characterized by the solvent phase being an alcohol.

5. A process according to claim 1, characterized by the liquid fraction contained in the gas to be compressed and which is recovered at the periphery of the rotor providing a seal between the rotor and the housing.

6. A process according to claim 1, characterized by compressor being a screw compressor.

7. A process according to claim 1, characterized by compressor being a liquid ring compressor.

8. A process according to claim 1, characterized by the flowrate of liquid fraction collected at the outlet of compressor which is recycled to the inlet of this compressor being controlled such as to represent 2 to 20% of the gas flowrate under discharge conditions.

9. A process according to claim 1, characterized by compressor being a centrifugal compressor.

10. A process according to claim 1, characterized by the ratio between the volume flowrate of liquid to the volume flowrate of gas under discharge conditions of compressor being less than 50%.

11. A process according to claim 1, characterized by natural gas being produced at sea by means of under-sea well heads and transferred to the surface by flexible pipes, compression stage (c) being performed on a fixed or floating platform.

12. A process according to claim 1, characterized by natural gas being produced at sea by means of under-sea well heads, stages (a) through (d) being accomplished under water.

13. A process according to claim 1, characterized by having a stage prior to stage (c) for mixing the gas and liquid hydrocarbon fraction to form homogeneously dispersed liquid droplets within the gas.

14. A process according to claim 1, wherein said gas containing a liquid hydrocarbon fraction is natural gas.

15. A device for transportation of gas containing a liquid hydrocarbon fraction, characterized by comprising, in combination, an inlet line for said gas to be transported connecting a gas source to an individual means for compressing and separating the liquid phase and the gas phase, said individual compressing and separating means comprising a compressor with rotating rotor, a gas phase outlet orifice, and a liquid phase outlet orifice; a line for introducing a solvent connecting a solvent source to the inlet line; a transport line connected to the gas phase outlet orifice; and a line for reintroduction of a liquid phase connecting the liquid phase outlet orifice to the transport line.

16. A device according to claim 15, characterized by comprising a line for recirculating the liquid phase produced by the recirculation means, said line connecting the liquid phase outlet orifice to inlet line for said gas.

17. A device according to claim 15, characterized by further comprising means for mixing the gas containing a liquid hydrocarbon fraction prior to introduction into said compressor, said means forming homogeneously dispersed liquid droplets within the gas.

* * * * *